US012658009B1

(12) United States Patent
Mccafferty

(10) Patent No.: US 12,658,009 B1
(45) Date of Patent: Jun. 16, 2026

(54) VOICE LED SERVICE DIAGNOSTIC TESTING

(71) Applicant: Cardtronics USA, Inc., Atlanta, GA (US)

(72) Inventor: Liam Fraser Mccafferty, Dundee (GB)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 19/208,844

(22) Filed: May 15, 2025

(51) Int. Cl.
| *G07F 19/00* | (2006.01) |
| *G06F 21/31* | (2013.01) |
| *G06F 40/20* | (2020.01) |
| *G07D 11/235* | (2019.01) |
| *H04W 4/80* | (2018.01) |

(52) U.S. Cl.
CPC ............ *G07F 19/209* (2013.01); *G06F 21/31* (2013.01); *G06F 40/20* (2020.01); *G07D 11/235* (2019.01); *H04W 4/80* (2018.02)

(58) Field of Classification Search
CPC .... G07F 19/206; G07F 19/209; G07F 19/211; G07D 11/235; H04W 4/80
See application file for complete search history.

(56) References Cited

U.S. PATENT DOCUMENTS

| 2014/0107836 A1* | 4/2014 | Crews ................... G07F 19/209 |
| | | 700/236 |
| 2015/0032607 A1* | 1/2015 | Chen .................... G06Q 10/083 |
| | | 701/31.5 |
| 2023/0252973 A1* | 8/2023 | Pratten .................... G10L 13/02 |
| | | 704/258 |

* cited by examiner

*Primary Examiner* — Laura A Gudorf
(74) *Attorney, Agent, or Firm* — Schwegman Lundberg & Woessner, P.A.

(57) ABSTRACT

An example technique, system, or device may be used for performing diagnostic functions on an automated teller machine (ATM). An example technique includes detecting that a diagnostic device has been inserted into a physical port of the ATM, sending, via a wireless protocol, an audio indication to a user device based on detecting that the diagnostic device has been inserted into the physical port, and receiving, via the wireless protocol from the user device, a diagnostic instruction corresponding to an action at the ATM. The example technique may include performing the action at the ATM, and sending, in response to the action completing at the ATM, a status of the ATM to the user device.

20 Claims, 8 Drawing Sheets

VOICE LED SERVICE DIAGNOSTIC TESTING

BACKGROUND

Note handling devices are machines designed to process, sort, and manage various types of notes. Note handling devices such as automated teller machines (ATMs) typically sort notes by denomination during deposits. These devices often include multiple bins to accommodate different types of notes.

SUMMARY

In various examples, methods and systems for performing diagnostic functions on an automated teller machine (ATM) are presented.

According to an example, a technique may include detecting that a diagnostic device has been inserted into a physical port, sending, via a wireless protocol, an audio indication to a user device based on detecting that the diagnostic device has been inserted into the physical port, receiving, via the wireless protocol from the user device, a diagnostic instruction corresponding to an action at the ATM, performing the action at the ATM, and sending, in response to the action completing at the ATM, a status of the ATM to the user device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

Figure 1:
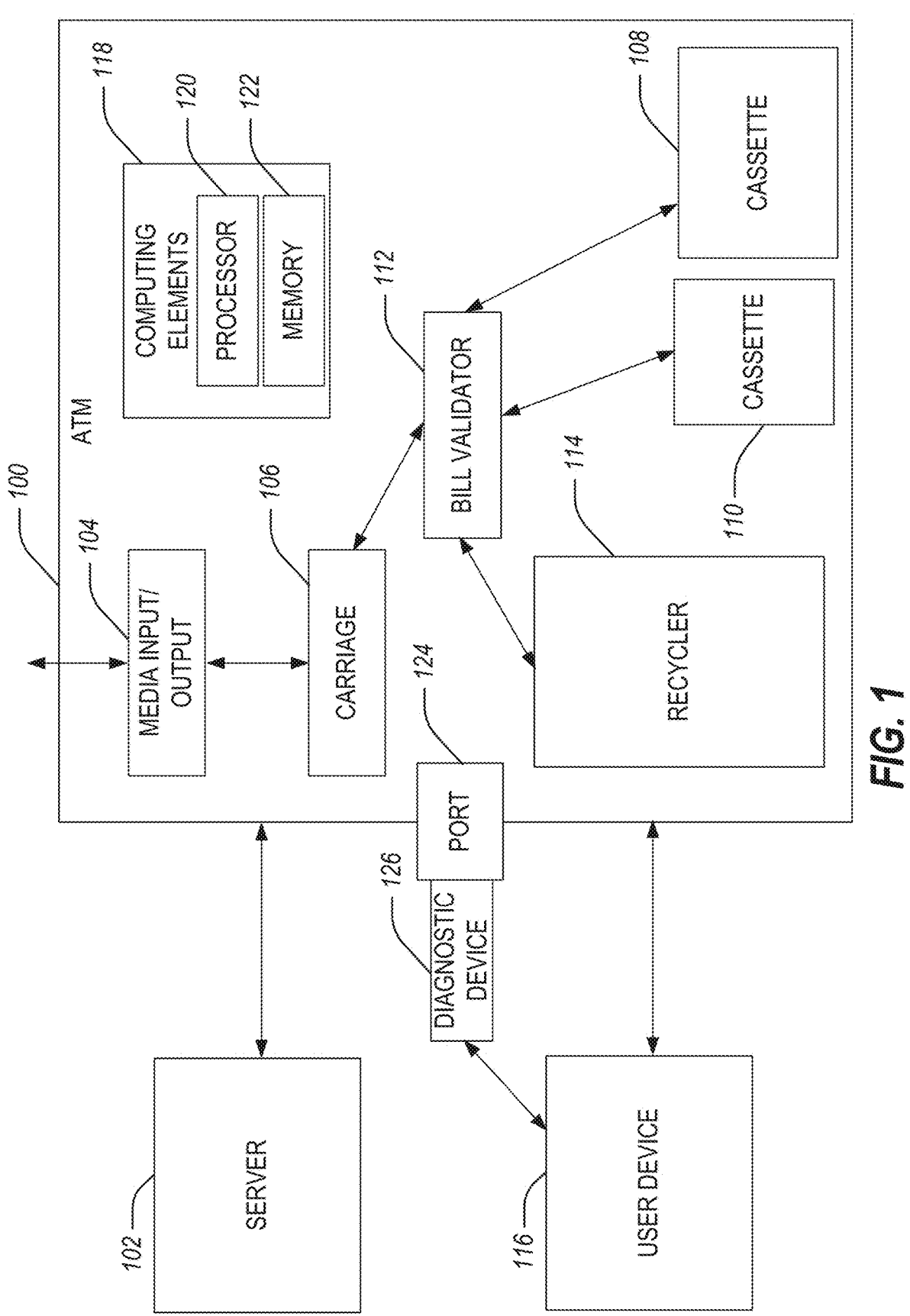
FIG. 1 illustrates generally a schematic diagram of an automated teller machine (ATM) in accordance with some examples.

The systems and techniques described herein may be used for performing diagnostic functions on an ATM. These systems and techniques may be used with voice led service diagnostic testing through a test application to aid or improve servicing of an ATM in the field. A service engineer at an ATM currently is limited to using a screen or Graphical Operator Panel (GOP) of the ATM to run diagnostic tests while performing debug and error recovery on a unit. Some of these displays are on fascias that pivot out of the way, making diagnostic tasks a two-handed operation with one hand to hold the fascia down and the other to select options on the touchscreen within an application. Two-handed operation is particularly problematic when the module being serviced or debugged is in a safe of the ATM. For example, even racking the module out does not improve the service issues because the service engineer still must change position to engage with the screen and the module, for example needing to crouch down quickly after pushing a button on a screen. For example, to view the module when a task such as a clear is run, the service engineer needs to select the clear and quickly check the safe. systems and techniques described herein allow a service engineer to trigger a service action while closely viewing any component of the ATM, which significantly increases speed, accuracy, and safety in debugging.

The systems and techniques described herein facilitate a connection via headphones, a microphone, a user device or the like to the ATM for diagnostic purposes. In an example, an engineer may connect headphones or a microphone, for example via Bluetooth or other wireless protocol directly, to the ATM. The microphone may be used to send a voice command to drive diagnostic tools at the ATM. A microphone and headphones may be used to replace a product touchscreen or a Graphical Operator Panel (GOP). In some examples, a microphone and headphones may be used with a screen of a mobile device (e.g., a tablet or phone). This setup may provide a faster or more intuitive service, allowing a user to initiate a diagnostic test without navigating through menus or pressing multiple buttons. Access to the ATM may be secured using a key (e.g., a USB key).

An engineer may examine an ATM while running a debug test with free hands to open or close items on the ATM during service by using a microphone and headphones. Using voice control, a service engineer may describe an observed issue with the ATM and receive information related to the described issue. For example, the ATM may return a suggestion for debugging steps. In some examples, the ATM may provide audio feedback on a possible issue for an error code. The ATM may describe actions or provide feedback upon completion. The ATM may send a suggestion, described action, or feedback based on receiving information from a large language model (LLM), which may run locally on the ATM or remotely (e.g., on a server). The ATM may provide or describe a photo or video (e.g., for an engineer to follow without seeing the photo or video). The ATM may interact via audio in a language convenient to the engineer. For example, the ATM may be configured to provide or receive audio in multiple languages, improving accessibility and aiding service engineers who do not share a first language with instructions or diagnostic information at the ATM. In some examples, feedback may be provided by the engineer to report an issue or suggest an improvement for the diagnostic system, which may be used to refine or retrain the LLM or other model.

FIG. 1 illustrates generally a schematic diagram of an ATM 100 in accordance with some examples. The ATM 100 may include computing elements 118, such as a processor 120 (e.g., processing circuitry) or memory 122 to execute instructions. The computing elements 118 may be used to control conveyance of media to or from the media input/output slot 104 from or to one of the cassettes 108 or 110 or the recycler 114.

The ATM 100 includes a media input/output slot 104 to receive or distribute media. The ATM 100 includes one or more cassettes, such as cassette 110, cassette 108, or a recycler 114. The ATM 100 may include a bill validator 112, such as using a camera, a sensor, or the like to recognize a note. Media may be conveyed to one of the cassettes 108 or 110 or the recycler 114 from the media input/output slot 104 via a carriage 106 and optionally through the bill validator 112. Media may be conveyed from one of the cassettes 108 or 110 or the recycler 114 to the media input/output slot 104 via a carriage 106 and optionally through the bill validator 112.

The ATM 100 may be in communication with a monitoring server 102. The monitoring server 102 may receive telemetry data from the ATM 100, such as diagnostic data. The monitoring server 102 may send instructions to the computing elements 118 (e.g., to restart the ATM 100, to output information to a display, etc.). The ATM 100 may be in communication with a user device 116 (e.g., a tablet, a mobile phone, etc.), such as wirelessly.

The ATM includes a physical port 124 configured to receive a diagnostic device 126 (e.g., a universal serial bus (USB) device). The physical port 124 may include circuitry communicatively coupled to the computing elements 118. The diagnostic device 126 may be used to authenticate a user (e.g., alone or with another form of authentication, such as a keyed in code, a password entered on a user interface of the ATM 100, or the like). The diagnostic device 126 may be configured to communicate wirelessly with the user device 116. The user device 116 may communicate with the ATM 100 via the diagnostic device 126, in some examples.

The computing elements 118 may send, for example via the diagnostic device 126 or directly, to the user device 116, diagnostic information related to the ATM 100. The user device 116 may communicate an instruction (e.g., directly or via the diagnostic device 126 to the computing elements 118) to execute an action at the ATM 100 (e.g., restart a component). In some examples, the computing elements 118 and the user device 116 may communicate via audio. The computing elements 118 may send an audio indication to the user device 116. The audio indication may be sent in response to determining, at the computing elements 118, that the diagnostic device 126 has been inserted into the physical port 124.

In an example, the user device 116 may send an audio diagnostic instruction to the computing elements 118. The audio diagnostic instruction may be processed by the computing elements 118 to extract a diagnostic instruction. In other examples, the audio diagnostic instruction may be sent to the monitoring server 102, which may extract a diagnostic instruction and send the diagnostic instruction back to computing elements 118 for execution (e.g., using a large language model (LLM)). In other examples, the user device 116 may send a text-based or selected instruction to the computing elements 118. The computing elements 118 may execute the diagnostic instruction. After execution, the computing elements 118 may send a status of the ATM 100 to the user device 116.

In some examples, the ATM 100 may have a default or selected language for communicating diagnostic information (e.g., English). The user device 116 may send instructions in a language other than the default or selected language, and the computing elements 118 or the monitoring server 102 may translate the instructions to the default or selected language. In this way, a user may interact with the ATM 100 in the user's preferred language, while the default or selected language of the ATM 100 is not changed.

Figure 2:
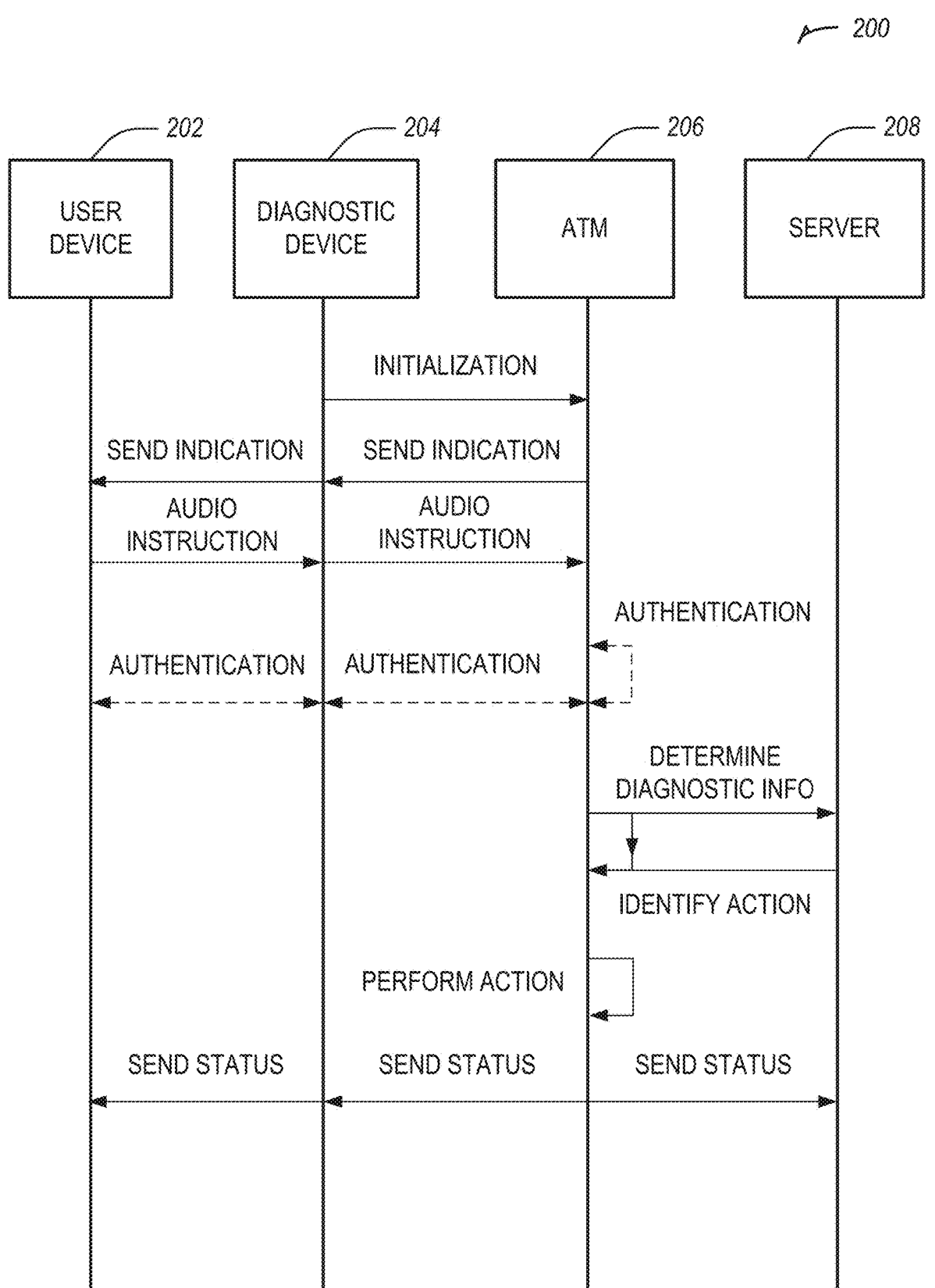
FIG. 2 illustrates a swim lane diagram showing data flow through a system in accordance with some examples.

FIG. 2 illustrates a swim lane diagram 200 showing data flow through a system in accordance with some examples. The swim lane diagram 200 involves communications between a user device 202, a diagnostic device 204, an ATM 206, and a server 208.

The swim lane diagram 200 begins with an initialization phase between the diagnostic device 204 and the ATM 206. During this initialization phase, the processing circuitry of the ATM 206 detects that the diagnostic device 204 has been inserted into a physical port of the ATM 206.

Upon detecting the diagnostic device 204, the ATM 206 sends an indication to the user device 202 (e.g., via the diagnostic device 204 using a wireless communication, such as a Bluetooth communication). In some examples, the indication includes an audio indication transmitted via a wireless protocol from the ATM 206 to the user device 202. The ATM 206 may send an indication to the server 208 to notify the server 208 that a diagnostic session has been initiated at the ATM 206.

The user device 202 receives the audio indication and, in response, may provide audio instructions to a technician operating the user device 202 (e.g., via a speaker of the user device 202. The audio instructions may guide the technician through a diagnostic procedure or request a diagnostic action.

The swim lane diagram 200 may optionally include an authentication phase, wherein authentication is performed among the user device 202, the diagnostic device 204, and the ATM 206. The authentication ensures that only authorized personnel may perform diagnostic operations on the ATM 206.

Following successful authentication, the ATM 206 determines diagnostic information corresponding to a current state of the ATM 206. An action may be determined corresponding to the diagnostic information at the ATM 206 or at the server 208 (e.g., after the diagnostic information is sent to the server 208, the server may determine and send the action to the ATM 206). In some examples, the ATM 206 may include a set of actions corresponding to known diagnostic issues. When a diagnostic issue does not correspond to an action in the set of actions, the ATM 206 may send the diagnostic information to the server 208. The server 208 may use an LLM to automatically determine an action corresponding to the diagnostic information.

After the action is identified from the diagnostic instruction, the processing circuitry of the ATM 206 may cause the identified action to be performed. The action may include one of various diagnostic functions such as testing or restarting a cash dispensing mechanism, a card reader, a receipt printer, or another component of the ATM 206.

After completing the action, the ATM 206 sends a status update to the user device 202 (e.g., via the diagnostic device 204) or the server 208. The status update may include information regarding the outcome of the diagnostic action, an error code, a performance metric, or other relevant diagnostic data.

Figure 3A:
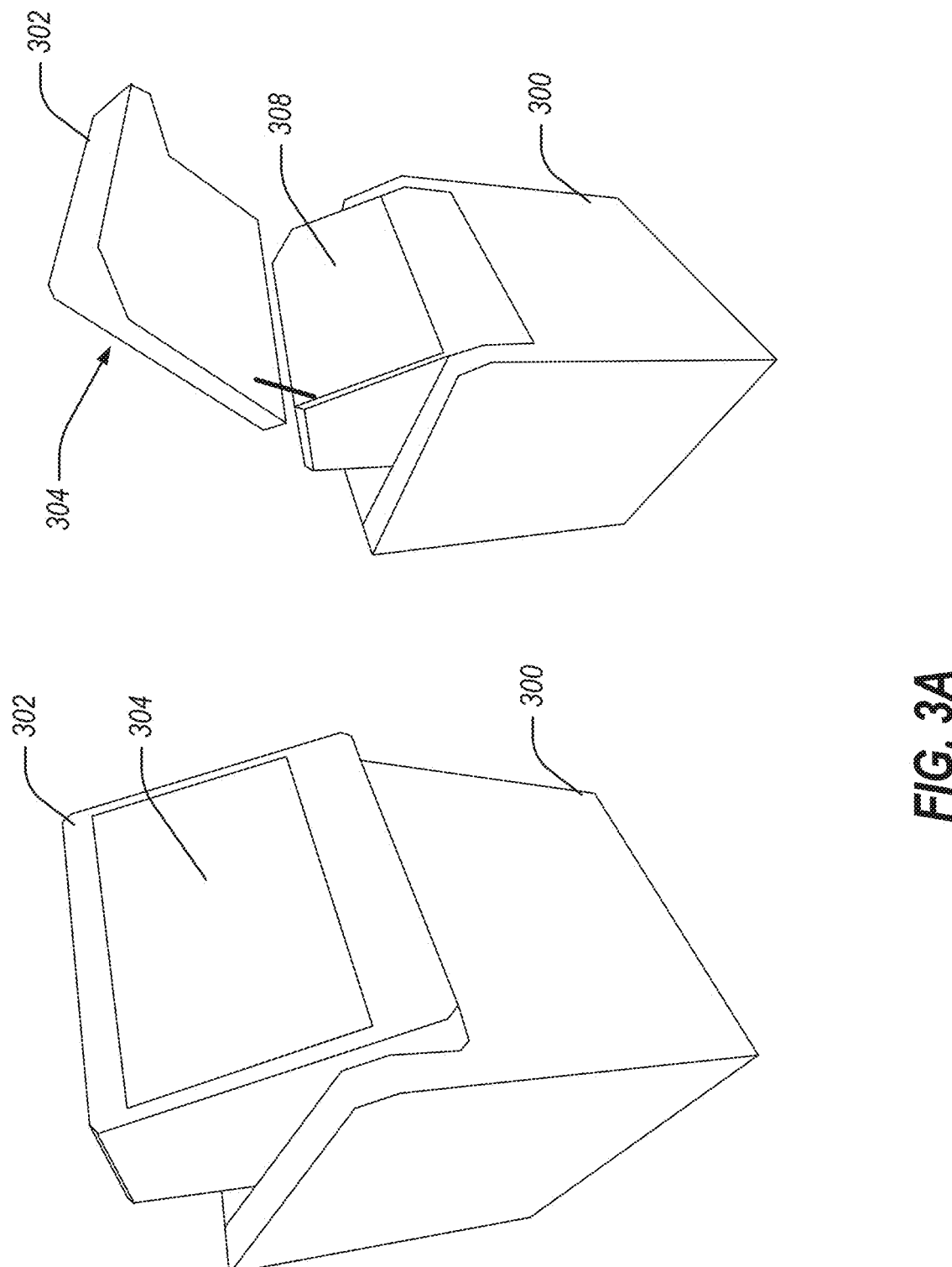
FIGS. 3A-3C illustrate various configurations of ATMs in diagnostic modes in accordance with some examples.
Figure 3B:
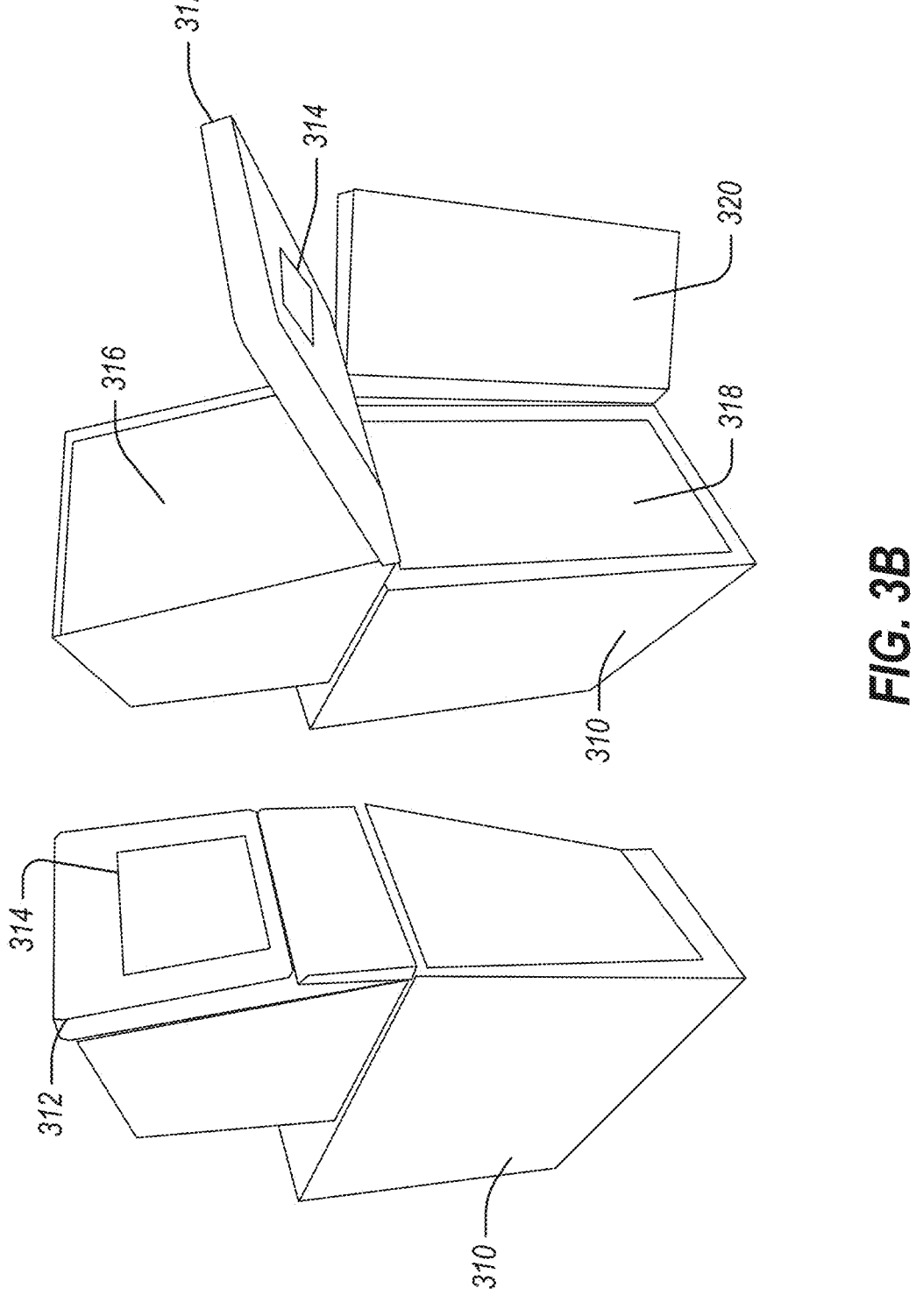
Figure 3C:
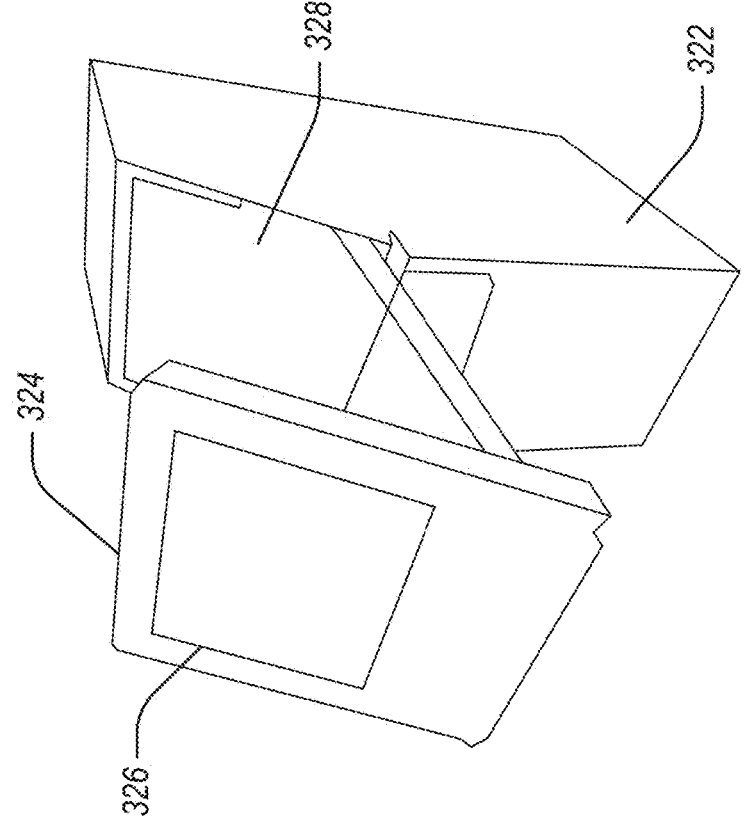
Figure 3C:
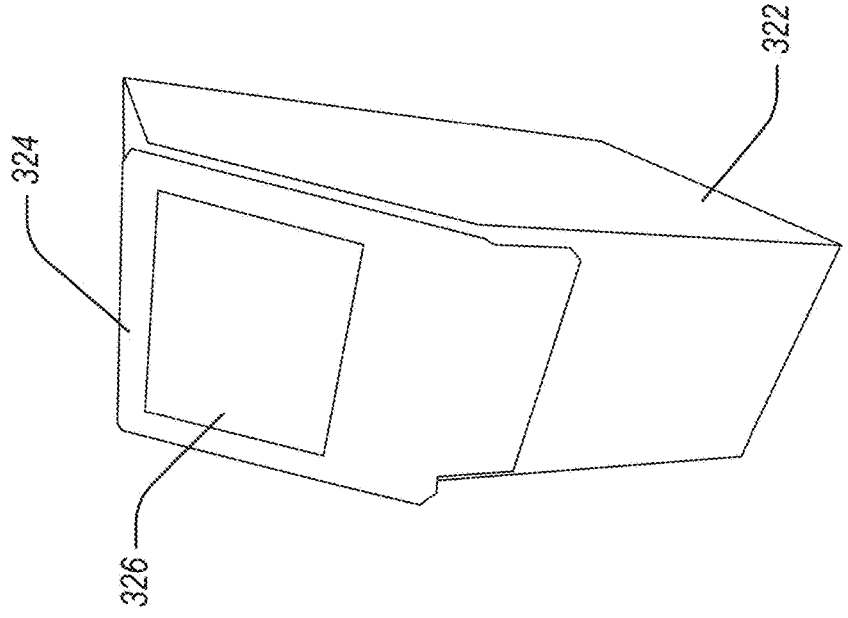

FIGS. 3A-3C illustrate various configurations of ATMs in diagnostic modes in accordance with some examples. FIG. 3A illustrates a first type of ATM 300 where a component 302 including a screen 304 rotates upward away from an internal service area 308. When open, the screen 304 is not convenient to view while servicing the service area 308 of the ATM 300. FIG. 3B illustrates a second type of ATM 310 where a component 312 including a screen 314 rotates downward away from a top of the ATM 310. While a first servicing area 318 may be somewhat convenient to access while viewing the screen 314, a second servicing area 316 is still difficult to both access and view the screen 314. In some examples, a door 320 to the first servicing area 318 may block a portion of the screen 314, making use of the screen 314 during servicing of the first servicing area 318 challenging. FIG. 3C illustrates a third type of ATM 322 where a component 324 including a screen 326 translates away from a base of the ATM 322 for servicing a service area 328. Use of the screen 326 and access to the servicing area 328 are not convenient together. The various configurations of ATMs may be used with the systems and techniques described herein to bypass use of the screens 304, 314, or 326 while performing diagnostic actions at the various ATMS 300, 310, or 322.

Figure 4:
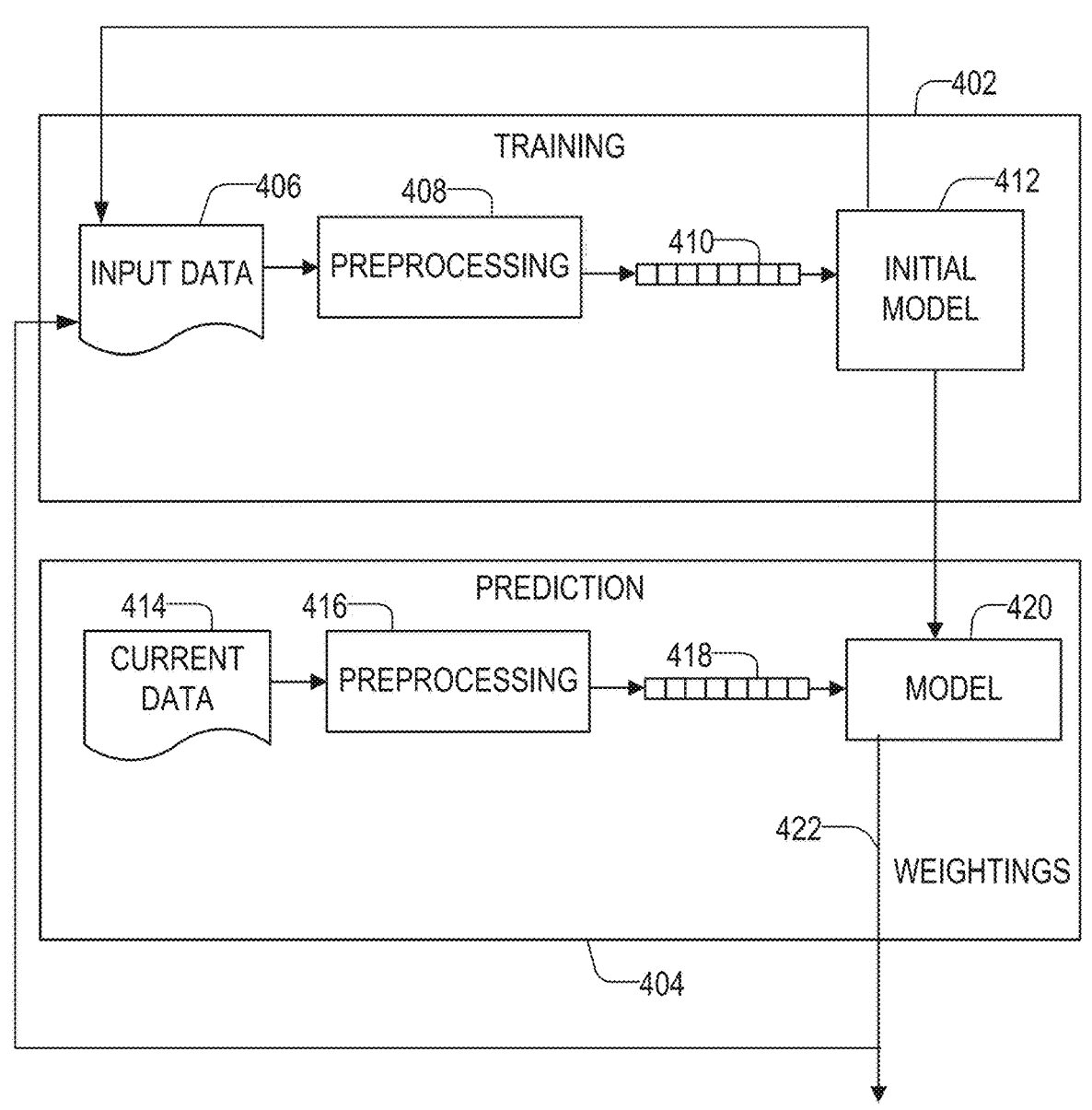
FIG. 4 illustrates a machine learning engine for training and execution related to performing diagnostic functions on an ATM in accordance with some examples.

FIG. 4 illustrates a machine learning engine for training and execution related to performing diagnostic functions on an ATM in accordance with some examples. The machine learning engine may be deployed to execute at a mobile device (e.g., a cell phone, a tablet, etc.) or a computer (e.g., a desktop, a laptop, etc.). FIG. 4 shows an example machine learning engine 400 according to some examples of the present disclosure.

Machine learning engine 400 uses a training engine 402 and a prediction engine 404. Training engine 402 uses input data 406, for example after undergoing preprocessing component 408, to determine one or more features 410. The one or more features 410 may be used to generate an initial model 412, which may be updated iteratively or with future labeled or unlabeled data (e.g., during reinforcement learning), for example to improve the performance of the prediction engine 404 or the initial model 412. An improved model may be redeployed for use.

The input data 406 may include a diagnostic instruction, audio, an error code, etc. In the prediction engine 404, current data 414 (e.g., a diagnostic instruction, audio, an error code, or the like) may be input to preprocessing component 416. In some examples, preprocessing component 416 and preprocessing component 408 are the same. The prediction engine 404 produces feature vector 418 from the preprocessed current data, which is input into the model 420 to generate one or more criteria weightings 422. The criteria weightings 422 may be used to output a prediction, as discussed further below.

The training engine 402 may operate in an offline manner to train the model 420 (e.g., on a server). The prediction engine 404 may be designed to operate in an online manner (e.g., in real-time, at a mobile device, on a wearable device, etc.). In some examples, the model 420 may be periodically updated via additional training (e.g., via updated input data 406 or based on labeled or unlabeled data output in the weightings 422) or based on identified future data, such as by using reinforcement learning to personalize a general model (e.g., the initial model 412) to a particular user.

Labels for the input data 406 may include a previous action that resolved an issue or error identified or identifiable from the input data 406, a linked action (e.g., from a known solution mapping), etc.

The initial model 412 may be updated using further input data 406 until a satisfactory model 420 is generated. The model 420 generation may be stopped according to a specified criteria (e.g., after sufficient input data is used, such as 1,000, 10,000, 100,000 data points, etc.) or when data converges (e.g., similar inputs produce similar outputs).

The specific machine learning algorithm used for the training engine 402 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C9.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training engine 402. In an example embodiment, a regression model is used and the model 420 is a vector of coefficients corresponding to a learned importance for each of the features in the vector of features 410, 418. A reinforcement learning model may use Q-Learning, a deep Q network, a Monte Carlo technique including policy evaluation and policy improvement, a State-Action-Reward-State-Action (SARSA), a Deep Deterministic Policy Gradient (DDPG), or the like.

Once trained, the model 420 may output a prediction, such as a suggested action for addressing a diagnostic issue or instruction, audio, or the like.

Figure 5:
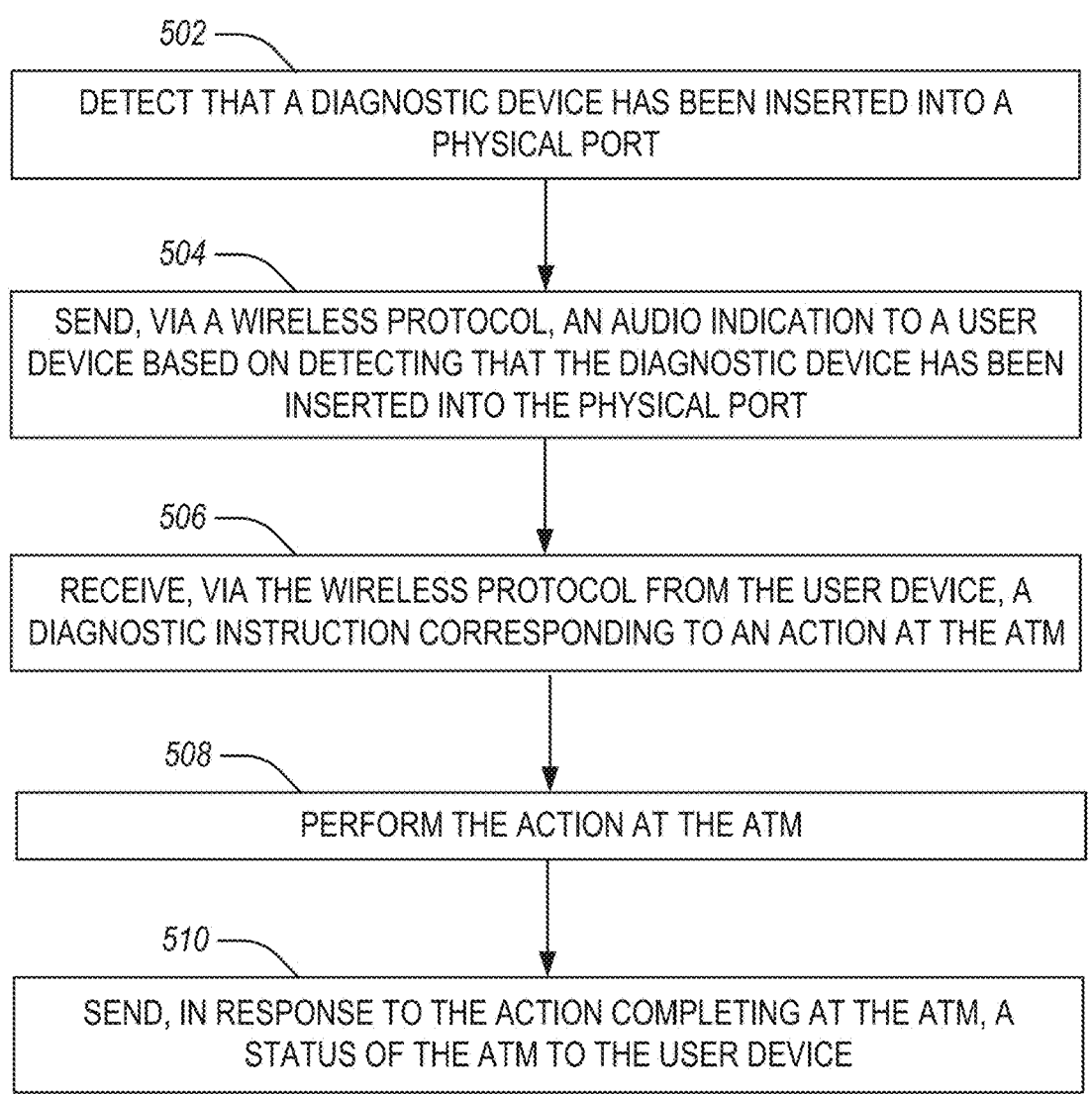
FIG. 5 illustrates generally a flowchart showing a technique for performing diagnostic functions on an ATM in accordance with some examples.

FIG. 5 illustrates generally a flowchart showing a technique 500 for performing diagnostic functions on an ATM in accordance with some examples. The technique 500 includes an operation 502 to detect that a diagnostic device has been inserted into a physical port of the ATM. The diagnostic device may include a universal serial bus device (USB) and the physical port may be a USB port.

The technique 500 includes an operation 504 to send, via a wireless protocol, an audio indication to a user device based on detecting that the diagnostic device has been inserted into the physical port. The wireless protocol may include near field communication (NFC), Bluetooth, Bluetooth low energy, WiFi, or the like.

The technique 500 includes an operation 506 to receive, via the wireless protocol from the user device, a diagnostic instruction corresponding to an action at the ATM. The technique 500 includes an operation 508 to perform the action at the ATM. The technique 500 includes an operation 510 to send, in response to the action completing at the ATM, a status of the ATM to the user device.

The technique 500 may include determining the diagnostic instruction using natural language processing on audio received from the user device, and identifying the action based on comparing the diagnostic instruction to a set of potential actions. The technique 500 may include determining the diagnostic instruction by providing audio received from the user device as an input to a large language model (LLM), and identifying the action using the LLM.

The technique 500 may include an example operation to send a log of the audio indication, the diagnostic instruction, the action, and the status to a remote server. This example operation may include receiving, from the remote server, a list of updated actions based on the log. The technique 500 may include, before performing the action at the ATM, authenticating a user of the user device via a spoken PIN and an identifier of the diagnostic device. The technique 500 may include, before performing the action at the ATM, authenticating a user of the user device via a PIN entered on a physical keypad or built-in user interface of the ATM and an identifier of the diagnostic device.

Figure 6:
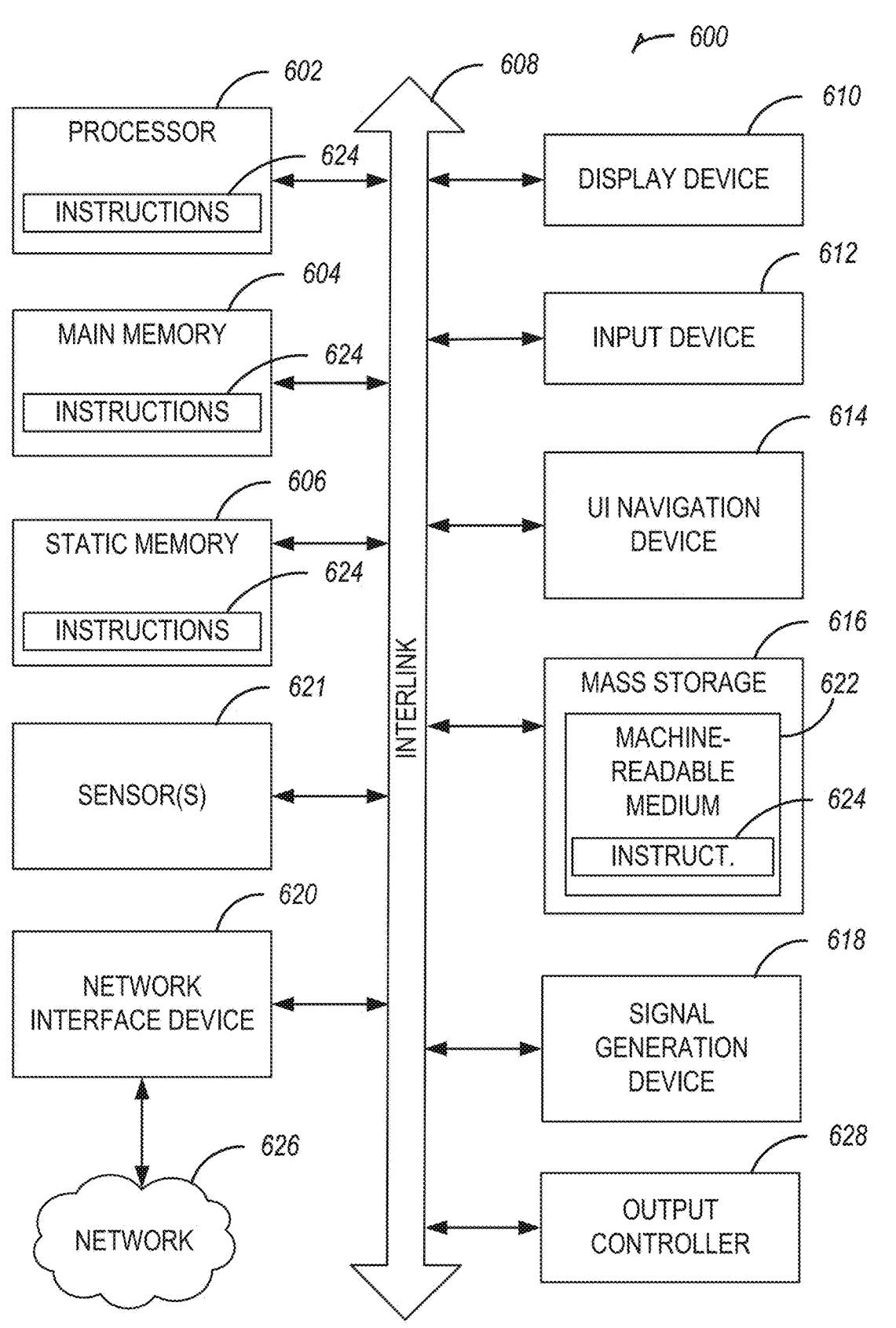
FIG. 6 illustrates generally an example of a block diagram of a machine upon which any one or more of the techniques discussed herein may perform in accordance with some examples.

FIG. 6 illustrates generally an example of a block diagram of a machine upon which any one or more of the techniques discussed herein may perform, according to various examples. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the execution units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

Each of these non-limiting examples may stand on its own, or may be combined in various permutations or combinations with one or more of the other examples.

Example 1 is at least one non-transitory machine-readable medium including instructions for performing diagnostic functions on an automated teller machine (ATM), which when executed by processing circuitry of the ATM, cause the processing circuitry to perform operations comprising: detecting that a diagnostic device has been inserted into a physical port of the ATM; sending, via a wireless protocol, an audio indication to a user device based on detecting that the diagnostic device has been inserted into the physical port; receiving, via the wireless protocol from the user device, a diagnostic instruction corresponding to an action at the ATM; performing the action at the ATM; and sending, in response to the action completing at the ATM, a status of the ATM to the user device.

In Example 2, the subject matter of Example 1 includes, wherein the operations further comprise: determining the diagnostic instruction using natural language processing on audio received from the user device; and identifying the action based on comparing the diagnostic instruction to a set of potential actions.

In Example 3, the subject matter of Examples 1-2 includes, wherein the operations further comprise: determining the diagnostic instruction by providing audio received from the user device as an input to a large language model (LLM); and identifying the action using the LLM.

In Example 4, the subject matter of Examples 1-3 includes, wherein the operations further comprise sending a log of the audio indication, the diagnostic instruction, the action, and the status to a remote server.

In Example 5, the subject matter of Example 4 includes, wherein the operations further comprise receiving, from the remote server, a list of updated actions based on the log.

In Example 6, the subject matter of Examples 1-5 includes, wherein the diagnostic device is a universal serial bus device (USB) and the physical port is a USB port.

In Example 7, the subject matter of Examples 1-6 includes, wherein the wireless protocol includes Bluetooth or Bluetooth low energy.

In Example 8, the subject matter of Examples 1-7 includes, wherein the operations further comprise, before performing the action at the ATM, authenticating a user of the user device via a spoken PIN and an identifier of the diagnostic device.

In Example 9, the subject matter of Examples 1-8 includes, wherein the operations further comprise, before performing the action at the ATM, authenticating a user of the user device via a PIN entered on a physical keypad or built-in user interface of the ATM and an identifier of the diagnostic device.

Example 10 is a method for performing diagnostic functions on an automated teller machine (ATM), the method comprising: detecting, using processing circuitry of the ATM, that a diagnostic device has been inserted into a physical port of the ATM; sending, via a wireless protocol, an audio indication to a user device based on detecting that the diagnostic device has been inserted into the physical port; receiving, via the wireless protocol from the user device, a diagnostic instruction corresponding to an action at the ATM; performing, using the processing circuitry of the ATM, the action at the ATM; and sending, in response to the action completing at the ATM, a status of the ATM to the user device.

In Example 11, the subject matter of Example 10 includes, determining the diagnostic instruction using natural language processing on audio received from the user device; and identifying the action based on comparing the diagnostic instruction to a set of potential actions.

In Example 12, the subject matter of Examples 10-11 includes, determining the diagnostic instruction by providing audio received from the user device as an input to a large language model (LLM); and identifying the action using the LLM.

In Example 13, the subject matter of Examples 10-12 includes, sending a log of the audio indication, the diagnostic instruction, the action, and the status to a remote server.

In Example 14, the subject matter of Example 13 includes, receiving, from the remote server, a list of updated actions based on the log.

In Example 15, the subject matter of Examples 10-14 includes, wherein the diagnostic device is a universal serial bus device (USB) and the physical port is a USB port.

In Example 16, the subject matter of Examples 10-15 includes, wherein the wireless protocol includes Bluetooth or Bluetooth low energy.

In Example 17, the subject matter of Examples 10-16 includes, before performing the action at the ATM, authenticating a user of the user device via a spoken PIN and an identifier of the diagnostic device.

In Example 18, the subject matter of Examples 10-17 includes, before performing the action at the ATM, authenticating a user of the user device via a PIN entered on a physical keypad or built-in user interface of the ATM and an identifier of the diagnostic device.

Example 19 is an automated teller machine (ATM) comprising: processing circuitry; and memory, including instructions for performing diagnostic functions on the ATM, which when executed by the processing circuitry, cause the processing circuitry to perform operations comprising: detecting that a diagnostic device has been inserted into a physical port of the ATM; sending, via a wireless protocol, an audio indication to a user device based on detecting that the diagnostic device has been inserted into the physical port; receiving, via the wireless protocol from the user device, a diagnostic instruction corresponding to an action at the ATM; performing the action at the ATM; and sending, in response to the action completing at the ATM, a status of the ATM to the user device.

In Example 20, the subject matter of Example 19 includes, wherein the operations further comprise: determining the diagnostic instruction by providing audio received from the user device as an input to a large language model (LLM); and identifying the action using the LLM.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. At least one non-transitory machine-readable medium including instructions for performing diagnostic functions on an automated teller machine (ATM), which when executed by processing circuitry of the ATM, cause the processing circuitry to perform operations comprising:

detecting that a diagnostic device has been inserted into a physical port of the ATM;

sending, via a wireless protocol, an audio indication to a user device based on detecting that the diagnostic device has been inserted into the physical port;

receiving, via the wireless protocol from the user device, a diagnostic instruction corresponding to an action at the ATM;

performing the action at the ATM; and sending, in response to the action completing at the ATM, a status of the ATM to the user device.

2. The at least one non-transitory machine-readable medium of claim 1, wherein the operations further comprise:

determining the diagnostic instruction using natural language processing on audio received from the user device; and identifying the action based on comparing the diagnostic instruction to a set of potential actions.

3. The at least one non-transitory machine-readable medium of claim 1, wherein the operations further comprise:

determining the diagnostic instruction by providing audio received from the user device as an input to a large language model (LLM); and identifying the action using the LLM.

4. The at least one non-transitory machine-readable medium of claim 1, wherein the operations further comprise sending a log of the audio indication, the diagnostic instruction, the action, and the status to a remote server.

5. The at least one non-transitory machine-readable medium of claim 4, wherein the operations further comprise receiving, from the remote server, a list of updated actions based on the log.

6. The at least one non-transitory machine-readable medium of claim 1, wherein the diagnostic device is a universal serial bus device (USB) and the physical port is a USB port.

7. The at least one non-transitory machine-readable medium of claim 1, wherein the wireless protocol includes Bluetooth or Bluetooth low energy.

8. The at least one non-transitory machine-readable medium of claim 1, wherein the operations further comprise, before performing the action at the ATM, authenticating a user of the user device via a spoken personal identification number (PIN) and an identifier of the diagnostic device.

9. The at least one non-transitory machine-readable medium of claim 1, wherein the operations further comprise, before performing the action at the ATM, authenticating a user of the user device via a personal identification number (PIN) entered on a physical keypad or built-in user interface of the ATM and an identifier of the diagnostic device.

10. A method for performing diagnostic functions on an automated teller machine (ATM), the method comprising:

detecting, using processing circuitry of the ATM, that a diagnostic device has been inserted into a physical port of the ATM;

sending, via a wireless protocol, an audio indication to a user device based on detecting that the diagnostic device has been inserted into the physical port;

receiving, via the wireless protocol from the user device, a diagnostic instruction corresponding to an action at the ATM;

performing, using the processing circuitry of the ATM, the action at the ATM; and sending, in response to the action completing at the ATM, a status of the ATM to the user device.

11. The method of claim 10, further comprising:

determining the diagnostic instruction using natural language processing on audio received from the user device; and identifying the action based on comparing the diagnostic instruction to a set of potential actions.

12. The method of claim 10, further comprising:

determining the diagnostic instruction by providing audio received from the user device as an input to a large language model (LLM); and identifying the action using the LLM.

13. The method of claim 10, further comprising sending a log of the audio indication, the diagnostic instruction, the action, and the status to a remote server.

14. The method of claim 13, further comprising, receiving, from the remote server, a list of updated actions based on the log.

15. The method of claim 10, wherein the diagnostic device is a universal serial bus device (USB) and the physical port is a USB port.

16. The method of claim 10, wherein the wireless protocol includes Bluetooth or Bluetooth low energy.

17. The method of claim 10, further comprising, before performing the action at the ATM, authenticating a user of the user device via a spoken personal identification number (PIN) and an identifier of the diagnostic device.

18. The method of claim 10, further comprising, before performing the action at the ATM, authenticating a user of the user device via a personal identification number (PIN) entered on a physical keypad or built-in user interface of the ATM and an identifier of the diagnostic device.

19. An automated teller machine (ATM) comprising:

processing circuitry; and memory, including instructions for performing diagnostic functions on the ATM, which when executed by the processing circuitry, cause the processing circuitry to perform operations comprising:

detecting that a diagnostic device has been inserted into a physical port of the ATM;

sending, via a wireless protocol, an audio indication to a user device based on detecting that the diagnostic device has been inserted into the physical port;

receiving, via the wireless protocol from the user device, a diagnostic instruction corresponding to an action at the ATM;

performing the action at the ATM; and sending, in response to the action completing at the ATM, a status of the ATM to the user device.

20. The ATM of claim 19, wherein the operations further comprise:

determining the diagnostic instruction by providing audio received from the user device as an input to a large language model (LLM); and identifying the action using the LLM.

* * * * *